Patented Mar. 11, 1941

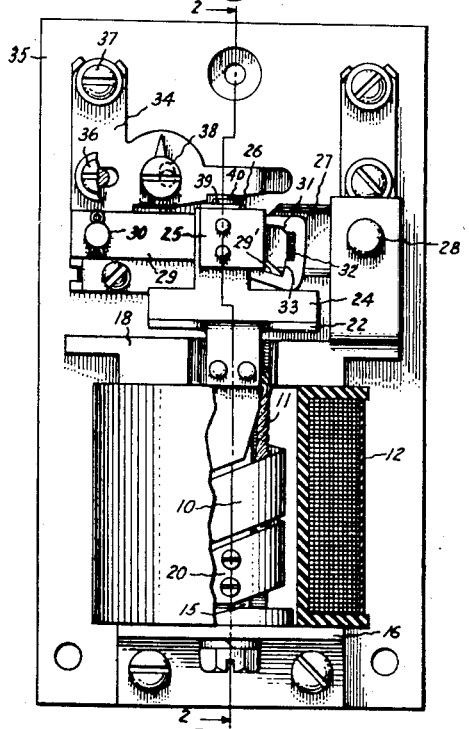

2,234,700

UNITED STATES PATENT OFFICE 2,234,700

CONTROL DEVICE

Benjamin W. Jones, Schenectady, N. Y., assignor to General Electric Company, a corporation of New York Application June 1, 1939, Serial No. 276,823

10 Claims. (Cl. 200—122)

My invention relates to control devices, more particularly to current responsive thermal overload protective relays for electric apparatus, particularly electric motors, and has for its object a simple and reliable relay which has approximately the same thermal characteristics as the motor during both heating and cooling so that the motor is not only deenergized to prevent overheating but it can be again energized after a short interval during which it has cooled sufficiently to permit service to be resumed.

In carrying out my invention, I provide means for heating a thermal element of the device to a temperature higher than its associated parts so that after it operates, heat is dissipated very rapidly from it to adjacent parts whereby the thermal element is cooled rapidly. In one form of my invention, the thermal element comprises a helical bimetallic thermostat having its ends electrically connected together to form a short circuited secondary of a primary winding or coil. This helical thermostat is mounted around a magnetic core member which serves as a heat storage mass whereby the thermostat is cooled rapidly, substantially as fast as the cooling rate of the motor. I have also provided an additional thermostat for compensating for ambient temperature changes.

For a more complete understanding of my invention, reference should be had to the accompanying drawing in which Fig. 1 is an elevation view of a thermal relay embodying my invention; Fig. 2 is a sectional view taken along the line 2—2 of Fig. 1 looking in the direction of the arrows; Fig. 3 is a plan view of Fig. 1 showing the contacts of the relay in circuit closed position; Fig. 4 is a view similar to Fig. 3 but showing the contacts open after operation of the thermostat; Fig. 5 is an enlarged detail view of a shock proof latching device for the electrical contacts while Fig. 6 is a diagrammatic representation of a motor protective system provided with a relay embodying my invention.

Referring to the drawing, my invention in one form comprises a helically wound bimetallic thermostatic strip 10 having its ends electrically connected together through a flexible conductor 11, shown as a stranded conductor, so as to form a short circuited secondary winding for an inducing coil 12 closely surrounding it. It will be understood that the coil 12 is provided with suitable terminals by means of which the coil is connected in the circuit to be controlled so that it is energized in accordance with the current in the circuit to be controlled. Also the coil 12 may be energized through a suitable current transformer means (not shown) to which the coil is connected. In the event of an excessive current, i. e., overload, in the coil 12, the thermostat is heated to such a temperature by the high current induced in it that it flexes sufficiently to release a movable contact 13 cooperating with the stationary contact 14 an thereby opens the controlled circuit which may be the circuit of an electric motor.

The arrangement of the bimetallic thermostat 10 as the short circuited transformer secondary winding of a primary inducing coil 12 provides for the heating of the thermostat to a temperature much higher than the temperature of the adjacent parts. In order that the thermostat may be cooled quickly after operation, I closely associate it with a member or leg 15 made of magnetic material and forming a part of the magnetic core for the coil 12, which leg provides a reservoir for the storage of the heat generated in the thermostat. This leg 15 cooperates with the other legs 16, 17 and 18 to form a magnetic core for the coil 12. As shown, the leg 15 is cylindrical and of nearly the same diameter as the cylindrical helix 10, the leg being sufficiently smaller than the helix to provide a small air space 19 between the two for electrical insulation purposes, and the thermostat 10 being wound flatwise with respect to said leg. This space 19 however is small enough so that the thermostat is in good thermal relation with the core leg 15 and the heat of the thermostat is transferred rapidly across this space to the leg by radiation and convection.

As shown, the thermostat has its lower end 20 rigidly secured as by screws and solder in good thermal relation to the lower end of the leg 15, a metal spacing member 21 being provided between them. The upper end of the thermostat is secured to the down turned projection of a member 22 which member extends across the upper end of the leg and is pivoted on a pivot pin 23 secured to the leg and extending lengthwise therewith coincident with the longitudinal center line of the leg 15. The member 22 and the parts secured to it are supported by the thermostat and are turned about the pin 23 by movement of the upper end of the thermostat in response to its flexure caused by changes in temperature.

A block of electrically insulating material 24 is secured on the member 22. This block carries a second bimetallic thermostat 25 having one end bent at right angles and secured to the down turned end of a strip 26 which is secured to the top of the block and extends in parallel relation with the block and with the thermostat 25. The thermostat 25 has its main substantially straight portion extending at right angles with the axis of the helix 10. The opposite end of this thermostat 25 is free to move and normally is in abutting relation with a transversely extending flexible arm 27 carrying the movable contact 13. This arm 27 is provided with an aperture 27' into which the end of the thermostat 25 moves to release the arm 27 in response to predetermined temperature. In other words, the helical thermostat, upon an increase in temperature, flexes in a direction to unwind itself so that the support 24 and the thermostat 25 are moved in a clockwise direction, as seen in Fig. 3, about the pivot pin 23.

The bimetallic thermostatic strip 25 is furthermore so arranged as to act as a compensator for changes in atmospheric or ambient temperature. Thus, when the thermostat 10 unwinds upon an increase in ambient temperature, the thermostat 25 substantially offsets this movement by flexing in a direction tending to move its free end toward the left, as seen in Fig. 3, so that the end of the thermostat 25 does not move on the switch arm 27 in response to ambient temperature changes.

When the contact arm 27 is released, as seen in Fig. 4, it may again be moved to the closed circuit position by pressing the button 28 which is biased to the position shown by the spring 28a. Preferably this is done after the short interval of a second or more required for the thermostat 10 to be cooled sufficiently for the free end of the thermostat 25 to hold the switch arm 27 in its closed position.

Another feature disclosed, but not my invention, is shock-proof latch mechanism, comprising a member 29 which is pivoted on a stationary pin 30. The free end of the latch 29 is provided with an aperture 29' which is considerably larger than the thermostat 25 and normally with the thermostat 25 in position to hold the switch arm 27, the latch 29 rests on the thermostat 25. When the thermostat 25 is moved by the thermostat 10 in a direction to release the contact arm 27, it first engages an inclined edge 31 on the member 29 whereby the latch 29 is lifted somewhat so that the thermostat 25 moves into a recess or notch 32 which is smaller than the opening 29' and does not extend to the bottom of the opening 29'. With this construction, if the thermostat 25 is moved suddenly as by a shock in a direction to release the switch arm 27, its forcible engagement with the inclined edge 31 throws the latch 29 upward about its pivot 30 with sufficient force to bring the lower edge of the opening 29' into engagement with the thermostat 25 so that the thermostat abuts against the lower right-hand edge 33 of the opening 29' and cannot enter the notch 32. This prevents movement of the thermostat sufficient to release the switch arm 27 and is a protection against opening of the relay from shocks.

As shown, the pivot pin 30 is mounted on a plate 34 to which also the left-hand end of the contact arm 27 is secured. This plate 34 is secured to the insulating base 35, supporting other parts of the relay, by means of screws 36 and 38. An elongated hole is provided in the plate 34 for the screw 36 so that the plate 34 may be moved toward the right or left hand as seen in Fig. 1 by turning the cam screw 38 to thereby adjust the position of the arm 27 and contact 13 and the pivot 30 with respect to the thermostat 25. This adjusts the current setting of the device. Electrical connection with the contact arm 27 is made by a terminal screw 37 on the plate 34.

This shock-proof latch mechanism is described and claimed in a co-pending application of George R. Townsend, Serial No. 274,663, filed May 19, 1939, and assigned to the same assignee as this application.

Also, as shown, the supporting strip 26 to which one end of the compensating thermostat 25 is secured, is mounted on the block 24 for adjustment with respect thereto. As shown, the strip 26 is secured to the block on a pin 39 and may be turned about this pin by turning a rivet or bolt 40, the bolt being provided with a cam 41 which cooperates with the sides of a slot 42 in the end of the strip 26. Preferably this is a factory adjustment. For example, the thermostat 10 may be heated to a predetermined temperature as by immersing it in hot water and the thermostat 25 then adjusted by turning the bolt 40 until the end of the thermostat just engages and holds the switch arm 27 in its closed circuit position as shown in Fig. 3. The bolt is then preferably secured permanently as by soldering its head to the strip 26. The purpose of this factory adjustment is to assure that the cam screw 38 will be in an approximately intermediate position when the desired adjustment of the pivot pin 30 is made. The advantage of this is that a substantial range of adjustment each way from the intermediate position is thereby assured.

This relay has the advantage that it may be adjusted for motors of various sizes by simply providing a coil 12 having a suitable number of turns. It is contemplated that the coil will be a current coil and connected directly in the circuit of the motor which is protected by the relay. It will, therefore, have a relatively few turns.

The block 24 of electrically insulating material serves also as a thermal insulator whereby the thermostat 25 is thermally insulated from the thermostat 10.

This relay has also the advantage that it gives protection for the motor under stalled rotor conditions as well as under running load conditions. To this end the magnetic core 15 is made of such small cross section that it is magnetically saturated to delay the rate of heating of the thermostat 10 for the higher currents. It will be understood that when the core 15 is saturated, or partially saturated, the magnetic flux through it does not increase in proportion to the current in the coil 12 and, consequently, the current induced in the thermostat 10, which is proportional to the magnetic flux in the core 15, does not increase in proportion to the current in the coil 12. For example, certain types of electric motors, when energized with their rotors stalled, carry approximately eight times their rated current, i. e., eight times their maximum permissible current. Under stalled rotor conditions, a motor of this type requires somewhat over 25 seconds to be heated to a temperature high enough to damage it. In a typical relay, the core 15 was made of such cross section that it was substantially saturated magnetically under stalled rotor motor conditions, i. e., with eight times the maximum permissible motor current, and the thermostat 10 operated to release the switch arm 13 and thereby deenergize the motor in about 25 seconds under this stalled rotor condition. This relay also gave very desirable protection against motor running overloads and was found to substantially duplicate or simulate the thermal conditions of the motor in that the thermostat 10 was heated to its maximum temperature sufficient to release the switch arm 27 in substantially the same time required for the hottest part of the motor, i. e., the copper, to reach a maximum permissible temperature.

As shown in Fig. 6, the contacts 13 and 14 may be included in the circuit of a coil 43 for a contactor 44 in the circuit of the motor 45. A normally open push button 46 is conventionally arranged to close the circuit of the coil 43 to initially close the contactor and start the motor. The push button 46 may then be released, the circuit of the coil 43 being maintained through the normally closed push button 47 and the interlock switch 48 on the contactor. It will be understood that when the contact 13 disengages the contact 14, the circuit of the coil 43 is opened whereupon the contactor drops out and the motor is deenergized. This, of course, deenergizes the primary inducing coil 12 of the relay and the relay and the motor immediately start to cool.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. A control device comprising a member made of magnetic material, a helical bimetallic thermostat surrounding said member, a coil surrounding said thermostat, said thermostat forming a closed secondary winding for said coil, and circuit control means operated by said thermostat upon distortion of said thermostat in response to changes in its temperature, said member forming a heat storage body, and said thermostat being closely associated with said member so that said thermostat is cooled rapidly by the transfer of heat to said member.

2. A thermal relay for electric motors comprising a member made of magnetic material, a bimetallic thermostat surrounding said member wound into a helix, a coil surrounding said thermostat, means for connecting said coil in the circuit of a motor, a conductor connecting together the ends of said helix to form a closed plural turn secondary winding for said coil, means securing one end of said helix, and circuit control means operated by the other end of said helix to deenergize said motor upon a predetermined distortion of said helix in response to changes in temperature, said member forming a heat storage body and said helix being associated with said member in good thermal relation therewith so that said helix is cooled rapidly by the transfer of heat to said member to simulate thereby the rate of cooling of said motor.

3. A control device comprising a member made of magnetic material, a bimetallic thermostatic strip wound flatwise into a helix closely surrounding said member in good thermal relation therewith, a coil surrounding said thermostat, a conductor connecting together the ends of said thermostat to form a closed secondary winding for said coil, and circuit control means operated by said thermostat upon distortion of said thermostat in response to changes in temperature, said magnetic member being proportioned with respect to said coil so as to be magnetically saturated by a predetermined current in said coil and thereby increase the time required to operate said circuit control means.

4. A control device comprising a member made of magnetic material, a coil surrounding said member, a bimetallic thermostat wound flatwise into a helix around said member between said member and said coil forming a closed secondary winding for said coil, means for connecting said coil for energization in accordance with the current in a motor, and circuit control means operated by said thermostat to deenergize the motor upon a predetermined distortion of said thermostat in response to change in its temperature, said thermostat being in good thermal relation with said magnetic member so as to be cooled by said magnetic member and said magnetic member being arranged to be magnetically saturated in response to the higher motor currents whereby said relay simulates both the heating and the cooling characteristics of the motor.

5. A thermal relay for electric motors comprising a member made of magnetic material, a bimetallic thermostat surrounding said member wound flatwise with respect to said member into a helix, a coil surrounding said thermostat, means for connecting said coil in the circuit of a motor, a conductor connecting together the ends of said helix to form a closed plural turn secondary winding for said coil, means securing one end of said helix, and circuit control means operated by the other end of said helix to open the circuit of the motor upon a predetermined distortion of said helix in response to changes in temperature, said helix being closely associated with said member in good thermal relation therewith so that said helix is cooled at a rate simulating the rate of cooling of the motor and said member being arranged to be magnetically saturated and thereby increase the time required to heat said helix in response to the higher currents in said coil so that the heating of said helix simulates the heating of the motor in whose circuit said coil is connected for all current values.

6. A control device comprising a member made of magnetic material, a bimetallic thermostat wound into a helix surrounding said member, a coil surrounding said helix, a conductor connecting together the ends of said helix to form a closed secondary winding for said coil, means securing one end of said helix, the other end of said helix being free to move in response to changes in temperature, a second bimetallic thermostat secured at one end to the free end of said helix and having its other end free to move, and circuit control means operated by the free end of said second thermostat upon distortion of said helix in response to changes in temperature, said second thermostat being arranged with respect to said helix so as to compensate for movement of the free end of said helix in response to changes in ambient temperature.

7. A control device comprising a member made of magnetic material, a bimetallic thermostat wound into a helix surrounding said member, a coil surrounding said helix, a conductor connecting together the ends of said helix to form a closed secondary winding for said coil, means securing one end of said helix, the other end of said helix being free to move in response to changes in temperature, a second bimetallic thermostat secured at one end to the free end of said helix having a portion extending substantially at right angles to the axis of said helix and having its other end free to move, and circuit control means operated by the free end of said second thermostat upon distortion of said helix in response to changes in temperature, said second thermostat being arranged with respect to said helix so as to compensate for movement of the free end of said helix in response to changes in ambient temperature whereby the free end of said second thermostat remains substantially stationary during changes in ambient temperature.

8. A control device comprising a member made of magnetic material, a bimetallic thermostat wound into a helix surrounding said member, a coil surrounding said helix, a conductor connecting together the ends of said helix to form a closed secondary winding for said coil, means securing one end of said helix, the other end of said helix being free to move in response to changes in temperature, a second bimetallic thermostat secured at one end to the free end of said helix having a portion extending substantially at right angles to the axis of said helix and having its other end free to move, and circuit control means operated by the free end of said second thermostat upon distortion of said helix in response to changes in temperature, said second thermostat being arranged with respect to said helix so as to compensate for movement of the free end of said helix in response to changes in ambient temperature whereby the free end of said second thermostat remains substantially stationary during changes in ambient temperature and said member being arranged to be magnetically saturated by the higher currents in said coil to increase thereby the time required for operation of said circuit control means.

9. A control device comprising a member made of magnetic material, a bimetallic thermostatic strip wound into a helix closely surrounding said member, a coil surrounding said helix, a conductor connecting together the ends of said helix to form a closed secondary winding for said coil, a connection between one end of said helix and said member whereby said end is secured, the other end of said helix being free to move in response to distortion caused by changes in temperature, a pivot pin extending lengthwise of said member, a member made of heat and electrically insulating material mounted on said pivot and secured to the free end of said helix, a second bimetallic thermostat secured to said electrically insulating member and having its free end movable in response to distortion of said helix caused by changes in the temperature of said helix, and circuit control means operated by movement of the free end of said second thermostat, said second thermostat being arranged to flex in opposition to the flexure of said helix so as to compensate for changes in ambient temperature.

10. A control device comprising a member made of magnetic material, a bimetallic thermostatic strip wound into a helix closely surrounding said member, a coil surrounding said helix, a conductor connecting together the ends of said helix to form a closed secondary winding for said coil, a connection between one end of said helix and said member whereby said end is secured, the other end of said helix being free to move in response to distortion caused by changes in temperature, a pivot pin secured to the end of said member and extending lengthwise therewith, a member made of heat and electrically insulating material mounted on said pivot and secured to the free end of said helix, a second bimetallic thermostat having one end secured to said electrically insulating member provided with a substantially straight portion extending laterally with respect to the axis of said helix and having its other end free to move in response to distortion of said helix caused by changes in the temperature of said helix, and circuit control means operated by movement of the free end of said second thermostat, said second thermostat being arranged to flex in opposition to the flexure of said helix in response to changes in temperature whereby the free end of said second thermostat remains stationary during ambient temperature changes and said helix being closely associated with said member so as to be cooled rapidly by the transfer of heat to said member.

BENJAMIN W. JONES.